United States Patent [19]
Inui

[11] 3,827,581
[45] Aug. 6, 1974

[54] APPARATUS FOR SUPPLYING SHAFT LIKE MATERIALS

[75] Inventor: Takao Inui, Osaka, Japan

[73] Assignee: Kabushiki Kaisha Tange Tekkosho (Tange Industries, Ltd.), Osaka-fu, Japan

[22] Filed: July 20, 1973

[21] Appl. No.: 381,333

[52] U.S. Cl. .............................. 214/1 PB, 214/1.4
[51] Int. Cl. ............................................ B65h 51/26
[58] Field of Search ............ 214/1 P, 1 PB, 1.1, 1.2, 214/1.3, 1.4, 1.5

[56] References Cited
UNITED STATES PATENTS

| | | | |
|---|---|---|---|
| 3,072,267 | 1/1963 | Gasparetti et al. | 214/1 PB |
| 3,353,688 | 11/1967 | Kuckelsberg | 214/1.3 |
| 3,655,067 | 4/1972 | White | 214/1 PB |

*Primary Examiner*—Frank E. Werner
*Attorney, Agent, or Firm*—Wenderoth, Lind & Ponack

[57] ABSTRACT

An automatic apparatus for supplying shaft-like materials to a processing machine having an insertion hole for the materials. The apparatus comprises an inclined table for queuing and supporting the materials thereon in parallel with the insertion hole of the processing machine, a lifting means provided at the lower end of the queuing table for lifting the materials one at a time, the lifting means serving also as a stopper for preventing the materials on the queuing table from dropping, a turnable chuck means for fetching the material on the lifting means, a driving means for turning the chuck means, and an insertion means for inserting the material held by the chuck means into the insertion hole of the processing machine. The chuck means is turnable from a first position in which the material is held by the chuck means coaxially with the insertion hole to a second position in which the chuck means locates just above the material lifted by the lifting means.

1 Claim, 6 Drawing Figures

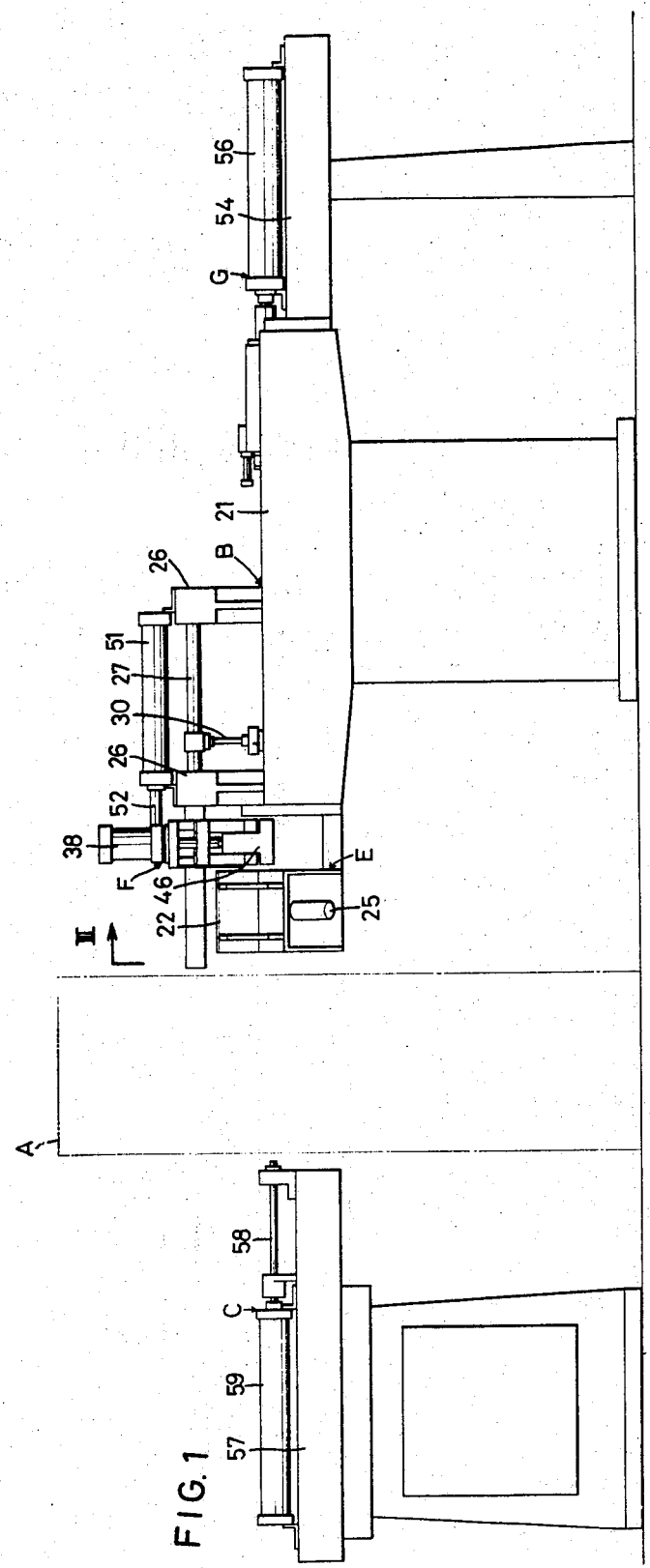
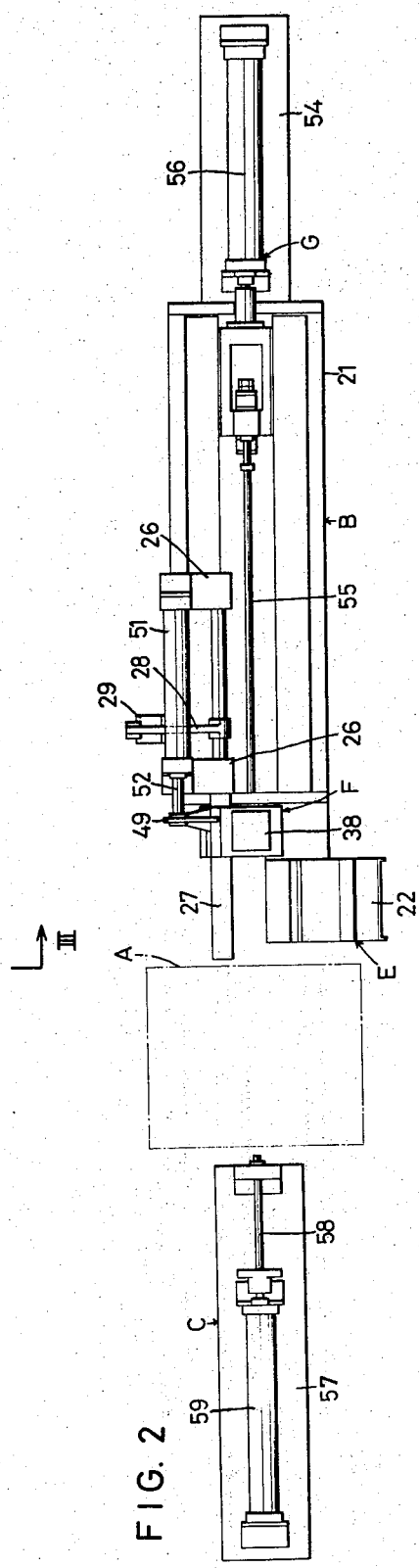

APPARATUS FOR SUPPLYING SHAFT LIKE MATERIALS

This invention relates to an automatic apparatus for supplying materials to be processed to a molding or processing machine and for ejecting said materials after processing.

Heretofore, when molding or processing a material, for example, when tapering a cylindrical shaft for use for a fork for supporting a front wheel of a bicycle, each said cylindrical shaft had to be supplied manually by a worker to a tapering machine.

When a material was manually supplied to a molding machine by a worker, the molding vibration was transmitted to the hands of the worker resulting not only in various kinds of occupational diseases but also in a reduction of operation efficiency.

An object of this invention is to solve the above problem, and to provide an automatic apparatus for supplying and ejecting materials so as to obtain the advantage of labor saving and increased efficiency in various processing operations.

This and other objects will be apparent from the following description of a preferred embodiment of the invention in reference to the accompanying drawings, in which:

FIG. 1 is an elevation of an apparatus of this invention;

FIG. 2 is a plan of the foregoing;

Figure 3:
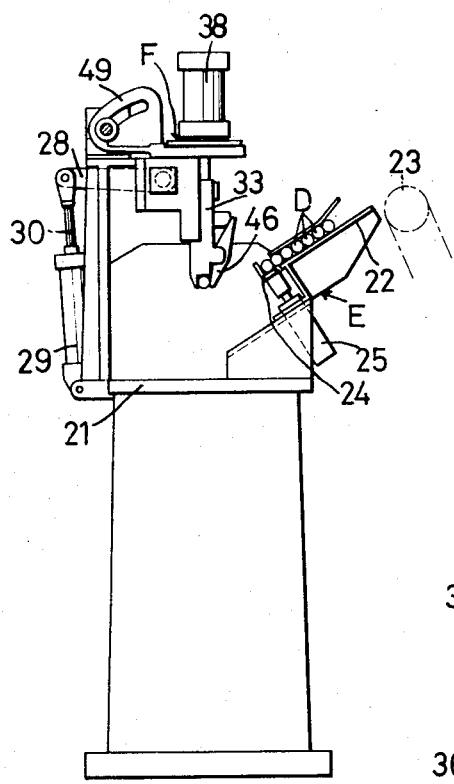
FIG. 3 is a side view taken on the line III—III of FIG. 1.
Figure 4:
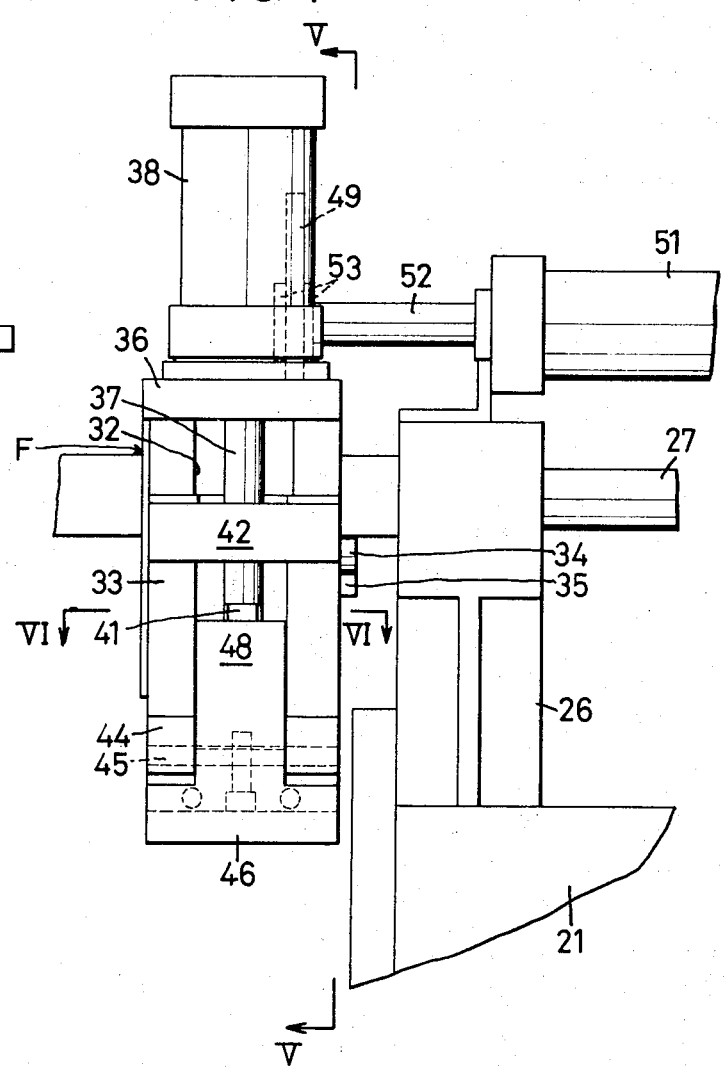
FIG. 4 is an elevation, on a magnified scale, showing the part of a chuck mechanism of the foregoing.

Referring to the drawings, the symbol A designates a machine for processing a material, the symbol B designating a supplying machine provided in front of the material receiving side of the processing machine A, the symbol C designating an ejecting machine provided at the rear of the processing machine A.

The processing machine A, though the details are not shown in the drawings, is provided thereinside with a mechanism, for example, for tapering a cylindrical shaft inserted into said machine from a front hole thereof so as to diminish the diameter of said cylindrical shaft from one end to the other end thereof.

The supplying machine B comprises a horizontal table 21 disposed at the front of the processing machine A at a predetermined distance therefrom, a material feeding means E provided between the table 21 and the processing machine for feeding and queuing materials D at a predetermined position, a chuck means F adjacent the feeding means E for taking up a material at the top of the queue on the feeding means E and bringing it to a position where the material is coaxial with the front hole of the processing machine A, and an insertion means G for forcing the material D brought by the chuck means F into the processing machine A.

As shown in FIGS. 1 and 3, the material feeding means E is mounted between the table 21 and the processing machine A, and comprises a plate 22 inclined downwardly toward its inner end so as to queue the materials D conveyed from a conveyor 23 the forward end of which confronts with the upper end of the plate 22, a stopper 24 normally coplanar with the plate 22 at the lower end thereof for supporting the lowest material D in the queue, and a cylinder 25 the piston rod of which is connected to the lower face of the stopper 24, which thereby is adapted to lift the lowermost material D by the action of the cylinder 25 while preventing other materials D on the plate 22 from dropping.

The conveyor 23 is electrically connected to a limit switch (not shown) provided on the inclined plate 22, the conveyor 23 being adapted to stop when a predetermined amount of materials D have been supplied onto the inclined plate 22 and to start to supply with the materials D when the amount thereof on the inclined plate 22 reduces.

A pair of bearings 26 are erected respectively at the front and middle of the upper face of the table 21, a shaft 27 being rotatably supported respectively at the rear end and the center thereof by means of the bearings 26, half the shaft 27 projecting from the front bearing 26 being formed into a square shaft. An arm 28 is secured to the shaft 27 at the middle between the bearings 26, as shown in FIGS. 1 and 2, said arm 28 projecting leftward as viewed from FIG. 3. A cylinder 29 is securely mounted on the table 21, an upper end of a piston rod 30 of the cylinder 29 being pivotally connected to the lefthand end of the arm 28 thereby the shaft 27 being rotated within predetermined angles by the action of the cylinder 29 through the arm 28.

The chuck means F is slidably mounted on the shaft 27 at the square portion thereof, said chuck means F being rotatable together with the shaft 27 by the action of the cylinder 29. As shown in FIGS. 3 to 6, the chuck means comprises a chuck body 31 slidably mounted on the shaft 27, a slider 33 vertically slidable along a vertical groove 32 formed in the front face of the chuck body 31, a projection 34 formed at the upper portion of one side face of the slider 33, a stopper 35 projecting from the front face of the chuck body 31 at the lower end thereof for engaging the projection 34 of the slider 33 in order to limit the lowest position thereof, a supporting table 36 secured to the upper face of the chuck body 31, a cylinder 38 securely mounted on the supporting table 36, a piston rod 37 of the cylinder 38 extending downward through the table 36 into a channel 39 vertically formed in the front face of the slider 33, a spring 40 mounted between the lower ends of the piston rod and the channel 38 so as to bias the slider 33 downward, an engaging piece 41 projecting from the lower end portion of the piston rod 37 leftwardly as viewed from FIG. 5, a bar 42 bridged on the channel 39 at the upper portion thereof for engaging the engaging piece 41 during the upward movement of the piston rod 37 and elevating the slider 33 together with the piston rod 37, a fixed claw 43 formed integrally with the slider 33 at the lower end thereof, a turnable claw 46 pivotally mounted at the middle thereof by means of a pin 45 between mounting members 44 projecting forward at both sides of the channel 39 at the lower end portion of the slider 33, and a spring 47 biasing said turnable claw 46 away from the fixed claw 43, said turnable claw 46 being moved towards the fixed claw 43 when the upper portion 48 of the claw 46 is pressed to open by the engaging piece 41 during the downward movement of the piston rod 37.

A guide plate 49 is secured onto the supporting table 36, a curved guide slot 50 being formed in the guide plate 49, the arc of the guide slot 50 centering the shaft 27. A cylinder 51 is longitudinally mounted between the upper ends of the bearings 26 erected on the table 21, the end portion of a piston rod 52 of the cylinder 51 being loosely inserted into the guide slot 50, collars 53 being secured to the piston rod 52 so as to clamp the guide plate 49 therebetween, thereby enabling the chuck means F to slide along the shaft 27 by the action of the cylinder 51. Moreover the guide slot 50 and the piston rod 52 engaged with the slot 50 are to define the rotating angles of the chuck means F which is rotated by the action of the cylinder 29 through the arm 28 fixed to the shaft 27, so that the claws 43 and 46 are stopped just above the material D on the stopper 24 when rotated counterclockwise from the vertical position.

The insertion means G comprises a table 54 extending rightwardly from the table 21 as viewed from FIG. 1, and a cylinder 56 with a piston rod 55 longitudinally mounted on the table 54, said piston rod 55 extending toward the processing machine A coaxially with the material insertion hole thereof, and having a predetermined stroke for inserting the material D held by the chuck means F into the material insertion hole of the processing machine A.

The ejecting means C disposed at the left of the processing machine A comprises a horizontal table 57, and a cylinder 59 with a piston rod 58 mounted longitudinally on the table 57, the piston rod 58 extending toward the processing machine A coaxially with the material insertion hole thereof for ejecting the processed material D from the processing machine A by the action of the cylinder 59.

Figure 5:
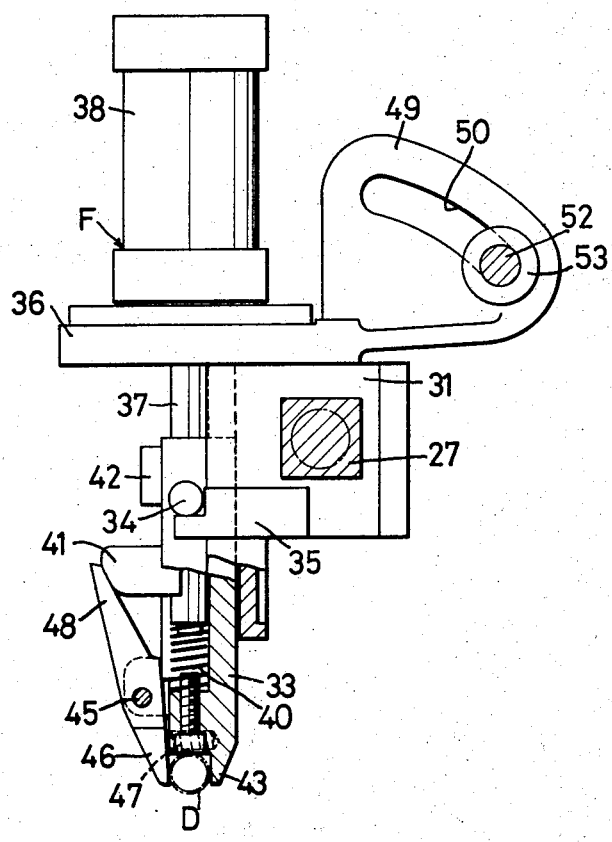
FIG. 5 is a vertical section, broken away in part, taken on the line V—V of FIG. 4.
Figure 6:
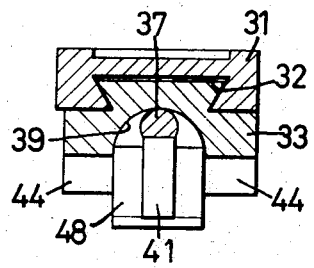
FIG. 6 is a cross sectional view taken on the line VI—VI of FIG. 4.

In the operation of the present apparatus for supplying shaft-like materials to a processing machine A, initially the shaft-like materials A with a fixed length are fed successively on the inclined plate 22 by means of the conveyor 23. The piston rod 30 is then retracted by the action of the cylinder 29 to cause the shaft 27 to rotate counterclockwise through the arm 28 as viewed from FIG. 3, thereby rotating the chuck means F at predetermined angles so that the claws 43 and 46 position just above the lowest material D on the stopper 24. At this time the piston rod 37 has been retracted and the claws 43 and 46 are fully opened by the action of the spring 47. The cylinder 25 beneath the stopper 24 then acts to lift the stopper 24 with the lowest material D thereon to a predetermined position. In this condition, the cylinder 38 acts to lower the piston rod 37 to cause the slider 33 to slide downward along the groove 32 until the projection 34 of the slider 33 contacts to the stopper 35 provided on the chuck body 31, the claws 43 and 46 thereby being positioned adjacent the material D lifted by the action of the cylinder 25. The piston rod 37 moves further downward compressing the spring 40 while the slider 33 is stopped by the stopper 35. Consequentely, the engaging piece 41 moves downward away from the bar 42 to engage the upper portion 48 of the turnable claw 46 thereby forcing open the upper portion 48 to cause the turnable claw 46 to turn around the pivot 45 toward the fixed claw 43 to nip the material D therebetween as shown in FIG. 5.

The cylinder 35 then acts to lower the stopper 24 to its original position where the stopper 24 supports a next material D rolled thereon from the queue on the inclined table 22. After lowering of the stopper 24, the cylinder 29 acts to elevate the piston rod 30 to cause the chuck means F to rotate clockwise through the arm 28 as viewed from FIG. 3 until the axis of the piston rod 37 becomes vertical, whereby the material D is held by the chuck means F coaxially with the insertion hole of the processing machine A between the table 21 and the processing machine.

In this condition, the cylinders 51 and 56 act synchronously so that the piston rod 55 of the cylinder 56 advances to push the rear end of the material D and at the same time the piston rod 52 of the cylinder 51 advances to move the chuck means F toward the processing machine A along the shaft 27. The material D is then forced into the insertion hole of the processing machine A by the further advancement of the piston rod 55. Upon insertion of the material D into the processing machine, the cylinder 38 acts to elevate the piston rod 37 together with the engaging piece 41 to release the upper portion 48 of the turnable claw 46 from opening thereby causing the turnable claw 46 to turn away from the fixed claw 43 by the action of the spring 47 to release the material D nipped therebetween. The engaging piece 41 then contacts to the bar 42 to cause the slider 33 to elevate together with the piston rod 37 along the groove 32. Consequently, the chuck means F does not affect the inserting of the material D by the piston rod 55 since the claws 43 and 46 release the material D and remove from the path of the piston rod 55.

The chuck means F is returned to its original position along the shaft 27 by the retraction of the piston rod 52 by the action of the cylinder 51, and also the piston rod 55 is retreated by the action of the cylinder 56 to be prepared for the next operation after the material D has been inserted into the processing machine.

Upon completion of the process of the material D in the processing machine, the ejecting means C is operated so that the piston rod 58 is advanced toward the processing machine by the action of the cylinder 59 to eject the processed material D out of the processing machine. The cylinder 59 then acts to retreat the piston rod 58 for the next operation.

The above operation is repeated and the shaft-like materials can be automatically supplied to and ejected from a processing machine.

What is claimed is:

1. An automatic apparatus for supplying shaft-like materials to a processing machine having an insertion hole for the materials, said apparatus comprising an inclined table for queuing and supporting the materials in parallel with the insertion hole of the processing machine, a means provided at the lower end of said queuing table for lifting the materials one at a time and for preventing the materials on said queuing table from dropping, a chuck means slidable toward and away from the processing machine and turnable from a first position to a second position so as to fetch the material on said lifting means, said first position being where said chuck means holds the material coaxially with the insertion hole of the processing machine, said second position being where said chuck means locates just above the material lifted by said means for lifting the material, a driving means for reciprocally driving said chuck means from the first position to the second position, and an insertion means for inserting the material held by said chuck means at the first position thereof into the insertion hole of the processing machine synchronously with the movement of the chuck means toward the processing machine.

* * * * *